United States Patent [19]

Segredo

[11] 4,300,449
[45] Nov. 17, 1981

[54] CITRUS FRUIT JUICE EXTRACTOR HAVING A MULTIPLE CHAMBER JUICE MANIFOLD

[75] Inventor: Guillermo T. Segredo, Lakeland, Fla.

[73] Assignee: FMC Corporation, Chicago, Ill.

[21] Appl. No.: 178,250

[22] Filed: Aug. 15, 1980

[51] Int. Cl.³ .............................................. B30B 9/02
[52] U.S. Cl. .................................. 100/98 R; 99/496; 100/108; 100/213
[58] Field of Search ............... 100/37, 98 R, 107, 108, 100/213, 39; 99/495, 496

[56] References Cited

U.S. PATENT DOCUMENTS

| | | | |
|---|---|---|---|
| 2,649,730 | 8/1953 | Hait | 100/108 X |
| 2,780,988 | 2/1957 | Belk | 100/108 X |

Primary Examiner—Billy J. Wilhite
Attorney, Agent, or Firm—R. B. Megley

[57] ABSTRACT

A citrus fruit juice extractor wherein a whole citrus fruit is squeezed between a pair of opposed cups to force the juice-bearing internal portions of the fruit into a strainer tube and wherein an orifice or plunger tube is driven upwardly within the strainer tube concurrently to force juice and some minute solid material through the perforations in the strainer tube is disclosed herein. The extractor includes a juice collection manifold having separate chambers arranged along the length of the strainer tube to receive juice extracted through separate portions of the strainer tube. Since the juice expressed through the end of the strainer tube that is farthest from the cups is subjected to considerably less pressure than the juice forced from the upper end of the strainer tube adjacent the cups, such juice component collected in the associated lower chamber of the manifold has less undesirable fruit material suspended therein than that of the juice in the upper chamber of the manifold.

6 Claims, 3 Drawing Figures

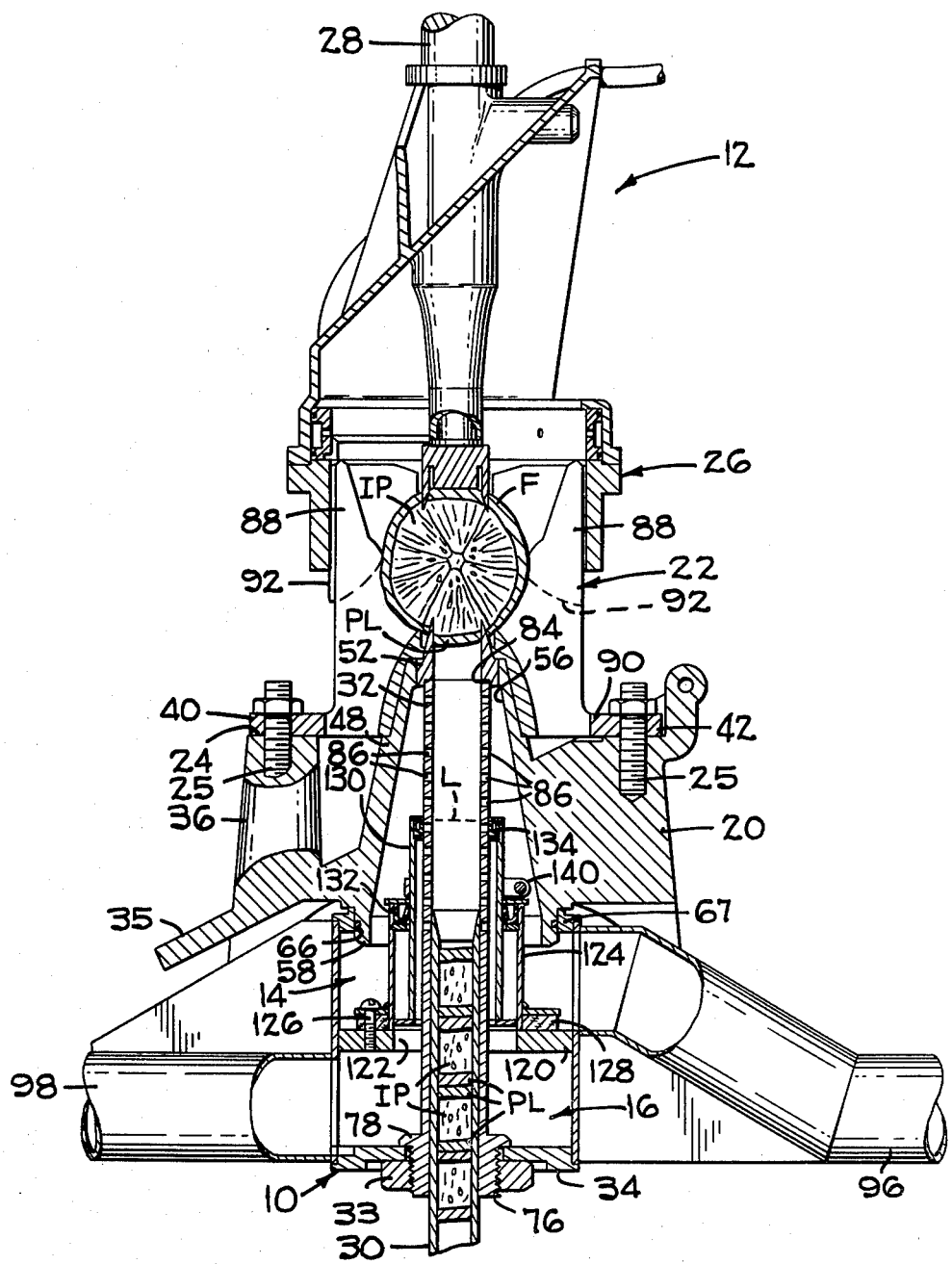
FIG_1

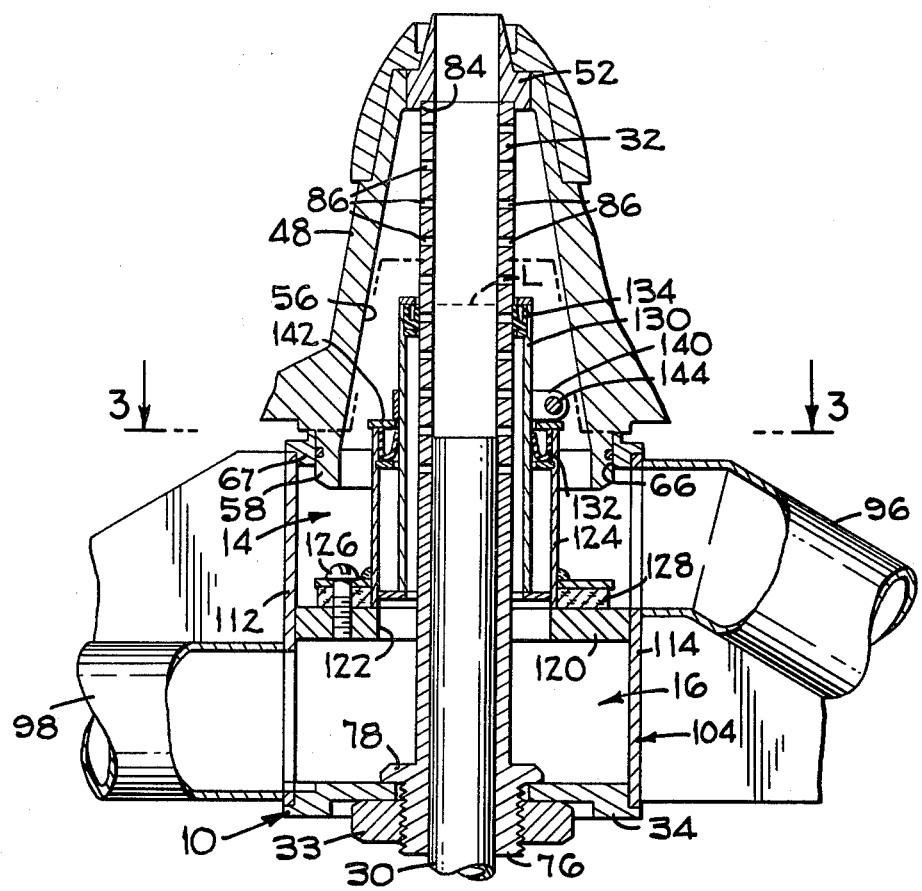

CITRUS FRUIT JUICE EXTRACTOR HAVING A MULTIPLE CHAMBER JUICE MANIFOLD

BACKGROUND OF THE INVENTION

1. Field of the Invention

The present invention generally relates to apparatus for extracting juice from fruit, and more particularly, the present invention relates to an improved extractor for extracting juice from citrus fruits.

2. Description of the Prior Art

The complete commercial processing of citrus fruit to obtain the juice therefrom today includes the dejuicing and discharging of the pulp and internal membranes of the fruit, the breaking up and ejecting of the peel, the extracting and collecting of the peel oil, and the separate extracting and collecting of the fruit juice. All of the above operations can be performed by the fruit juice extractor disclosed in the U.S. Pat. No. 2,649,730 to J. M. Hait and U.S. Pat. No. 2,780,988 to Wilber C. Belk et al.

In the extractor disclosed in the Belk et al patent, a whole unpeeled citrus fruit, for example, an orange, is placed between two cups, each of which is formed by a plurality of circumferentially spaced fingers and one of which is provided with a passage to allow discharge of juice and pulp from the fruit. The fingers of the upper and lower cups are arranged in an interdigitating relationship so that as cups are brought together, the cavity between the cups is progressively reduced to squeeze the juice from a fruit within the cavity. The peel of the fruit is shredded and ejected through an annular opening adjacent to the upper central portion of the upper cup. The juice-bearing material of the fruit is forced downwardly through the passage in the lower cup and into a perforated strainer tube that communicates with the lower cup. As the fruit is squeezed between the cups, an orifice tube is forced upwardly within the strainer tube to exert pressure on the juice-bearing material within the strainer tube to express the juice through the perforations therein. The juice expressed through the strainer tube is collected within a sump or manifold which extends transversely of the machine under the several lower cup assemblies.

The interdigitating cup type of juice extractor has been found to perform generally satisfactorily to extract a single grade of juice from a citrus fruit. However, the prior art citrus fruit juice extractors have not included juice collection systems that are capable of separating the extracted juice into differing grades. For example, the prior art extractors have not been adapted to separate the extracted juice into two juice components containing differing quantities of minute solid citrus material, such as juice sacs, suspended in the juice, or into two components of different grades wherein one component is of a lower grade in that it contains more minute membrane material or embryonic seeds suspended therein.

SUMMARY OF THE INVENTION

The present invention is concerned with an improved juice extractor having a dual chamber juice collection system adapted to separate the extracted juice into components that contain different quantities of minute solid citrus material suspended therein. Generally, the improved juice extractor includes at least one pair of opposed interdigitating cups that are adapted to squeeze a citrus fruit to force the juice-bearing internal portions of the fruit into a strainer tube that communicates with one of the cups. The improved extractor also includes an orifice tube reciprocatably mounted in the strainer tube for applying pressure to such juice-bearing material forced into the strainer tube to thereby express the juice and some minute solid citrus material through perforations in the strainer tube. According to the present invention, the juice expressed through the strainer tube is received in two chambers, one of the chambers being arranged to receive juice extracted through that part of the strainer tube that is proximal the extractor cups and the other of the chambers being arranged to receive juice expressed through another part of the strainer tube that is spaced apart from the extractor cups. The fraction of the juice that is collected within the chamber that is adjacent the cups will have been subjected to a relatively higher amount of pressure than the juice collected within the other chamber. Due to such higher pressure, the juice collected within the chamber that is proximal the extractor cups will contain a greater amount of suspended minute solid material or peel oil or both peel oil and solid material than the juice collected in the other chamber. Thus, the improved citrus fruit juice extractor of the present invention is capable of providing citrus juice fractions of differing qualities or grades.

BRIEF DESCRIPTION OF THE DRAWINGS

FIG. 1 is a fragmentary vertical section through a portion of a citrus fruit juice extractor in which the dual chamber juice collection manifold of the present invention is incorporated.

FIG. 2 is an enlarged fragmentary vertical section of the dual chamber manifold.

FIG. 3 is a reduced section taken generally on line 3—3 of FIG. 2.

DESCRIPTION OF THE PREFERRED EMBODIMENTS

Referring to FIG. 1, a dual chamber juice collection manifold 10 for separating juice into two separate grades is shown as being incorporated in a citrus fruit juice extractor 12 of the interdigitating cup type that is described in the aforementioned U.S. Pat. Nos. 2,649,730 and 2,780,988. Complete details of the construction of the juice extractor and the manner in which the various parts cooperate may be found in these patents, and the disclosures thereof are specifically incorporated herein by reference.

With reference to FIG. 1, the general structure of the juice extractor which encompasses the present invention will be described. The extractor includes a base section, an intermediate section, and a top powerhead section, with only a portion of the intermediate section being shown in the Figure. The intermediate section includes a bedplate 20 that extends transversely of the extractor. A series of spaced fruit-receiving lower cups 22 (only one being shown) are rigidly secured on a flat support surface 24 of the bedplate 20 by a number of stud bolts 25. An upper cup assembly 26 is mounted on the lower end of a drive rod 28 above each lower cup 22 so that an upper cup may be moved directly downwardly to engage a fruit disposed in the lower cup. Each cup-supporting drive rod 28 is secured at its upper end to a crosshead member (not shown) which is, in turn, mounted for vertical reciprocal movement. The crosshead member is reciprocated by drive means which is fully described in the aforementioned Belk et al and Hait patents.

In the base section of the machine, tubular plungers or orifice tubes 30 are secured in transversely spaced upright relationships on a vertically reciprocatable crossbeam (not shown). The lower crossbeam is reciprocated in timed relation to the upper crosshead member by drive means which are again fully described in the aforementioned Belk et al and Hait patents. The tubular plungers 30 slide within perforated strainer tubes 32. The upper end of each strainer tube is rigidly mounted to an annular cutter 52 which, in turn, is fixed to the bedplate 20 so that the strainer tube extends vertically downwardly from the center of each cup. As the lower crossbeam is reciprocated, the tubular plungers 30 slide up and down within the associated strainer tubes 32.

After a fruit is deposited in each of the lower cups 22, the associated upper cup in assembly 26 is moved downwardly to engage the fruit. At the same time, the plunger 30 below the lower cup is raised within the strainer tube 32 in timed relationship with the lowering of the upper cup assembly.

The bedplate 20 has a continuous top wall 35 that extends entirely across the extractor under all of the lower cups 22 and slants downwardly to provide a drain for peel oil extracted from the peel during the processing of the fruit. A series of posts 36 are integrally formed on the top wall 35 (one only shown in FIG. 1), and each post 36 is tapped to receive one of the stud bolts 25 which, in turn, anchors a tab 40 extending outwardly from the associated lower cup 22. A diametrically opposing tab 42 of each lower cup is anchored on the flattened surface 24 of the top wall by another stud bolt. A support portion 48 having a generally conical exterior surface extends upwardly from the bedplate wall 35 below each lower cup 22. The support portion 48 has an aperture in its upper end into which the annular cutter 52 is pressed (FIG. 2). This cutter has a circular cutting edge adapted to cut a plug from the underside of the skin of the citrus fruit when the fruit is pressed downwardly against the cutting edge by the upper cup assembly 26. The support portion 48 is hollowed to form a flared juice passage 56 terminating in an annular projection 58.

The entire base portion of the bedplate 20 is open to provide a space in which the upper end of the dual chamber juice-collecting manifold 10 is mounted. The manifold has several annular openings 66 (one only shown in FIGS. 1 and 2) formed in the top wall 67 thereof and the manifold is secured to the bedplate so that the annular projections 58 fit snugly in the openings 66. The manifold is provided with a series of openings in its bottom wall 34 for receiving the respective strainer tubes 32 and the strainer tubes have enlarged threaded ends 76 that extend through such openings with annular flanges 78 that bear against the interior surface of the bottom wall of the manifold. Nuts 33 are threaded on the end of each strainer tube to secure it in an upright position to the bottom wall of the manifold. The strainer tubes extend upwardly through the manifold and coaxially through the juice passages 56, and the upper ends thereof are tightly engaged in recesses 84 in the annular cutters 52 (FIG. 2). Each strainer tube is identical and is provided with small perforations 86 extending radially through the wall thereof from the upper end of the tube to the height of the annular projection 58 at the bottom end of the juice passage 56.

Each lower cup 22 comprises a plurality of equiangularly spaced, upstanding fingers 88 that extend upwardly from a hub portion 90. The upper cup in the associated upper cup assembly 26 is comprised of similar equiangularly spaced downwardly depending fingers 92. The fingers 92 of each upper cup are arranged in an interdigitating relationship with the fingers 88 of the associated lower cup so that when the cup assemblies are brought together, the lower ends of the upper fingers and the upper ends of the lower fingers are received in the spaces between the fingers to form a generally spherical pocket in the center of the cup assemblies to receive the fruit F. This pocket is then progressively contracted as the cup assemblies are moved together.

Generally, the contracting of the cavity between a pair of upper and lower cups first causes a plug PL (FIG. 1) to be cut from the underside of the fruit, and thereafter the cavity is reduced to the point where all of the juice and the other solid internal portions IP of the fruit are forced into the strainer tube 30. Such solid internal portions IP includes membranes, juice sacs, seeds, embryonic seeds, etc. Simultaneously therewith, the plunger tube 30 is moved upwardly. A series of plugs PL and fruit internal portions IP removed from previously processed fruits are engaged in the bore of the plunger, such plugs and material preventing the juice within the strainer tube 32 from egressing through the passage in the tubular plunger. As the plunger moves upwardly, juice and internal portions that are forced into the strainer tube by the compressing force of the cups upon the fruit will be placed under increasing pressure to force the juice and some minute particulate solid material, such as juice sacs or pieces of membranes, outwardly through the apertures 86 in the strainer tube. The thus-discharged juice and minute solid material is collected within the manifold 10.

As previously stated, the dual chamber manifold 10 enables two juices grades to be separately extracted from the citrus fruits. As seen in FIG. 2, the manifold has an upper chamber 14 adapted to collect an extracted juice that is expected to have a high particulate solids contents and a lower chamber 16 adapted to collect juice expected to have a low solids content. The two types of juice collected in the chamber 14 and 16 are fed through separate conduits 96 and 98, respectively, so that two types of juice can be handled separately by further processing equipment (not shown) to provide grade-differentiated citrus juice products.

Referring to FIGS. 2 and 3, the dual chamber manifold 10 will be seen to include a main housing 104 which extends transversely of the extractor. The housing 104, as previously indicated, includes the bottom wall 34 to which the strainer tubes 32 are attached and a top wall 67 having the openings 66 formed therein for the bedplate mountings. The housing further comprises vertical side walls 112 and 114 and semi-cylindrical end walls 116 and 118. A cross wall or partition 120 is welded between the side and end walls of the housing to extend horizontally midway between the top and bottom walls and partition the housing into the upper and lower chambers 14 and 16. The partition 120 has a series of uniformly spaced circular openings 122 formed therein that are much larger than the strainer tubes 32 and through which the tubes project. The upper chamber 14 is further divided from the lower chamber 16 by a plurality of outer cylindrical tubes 124 having outwardly flanged bottom ends which are rigidly secured by bolts 126 to the partition 120 in coaxial relation with the strainer tubes 32. A gasket 128 is provided between the flange of the tube 124 and the partition to form a fluid-tight seal. The final elements that divide the upper and lower chambers are inner cylindrical tubes 130 that are mounted within and spaced radially inwardly from the outer tubes 124. As shown most clearly in FIG. 2, an annular seal 132 is attached to the outer tube 124 and engaged between the inner and outer tubes 130, 124 adjacent the upper end of the outer tube. Also, a sealing ring 134 is mounted at the upper end of the inner tube 130 and engaged between the top ends of the inner tube and the associated strainer tube 32 to form a fluid-tight seal at the juncture line L (within the strainer tube) between the upper and lower chambers. That is to say, seals 134 form the dividing lines L within the strainer tubes above which juice flows into the upper chamber 14 and below which juice flows into the lower chamber 16.

As shown in FIGS. 2 and 3, the inner tubes 130 are adjustably secured by clamping bands 140 to the upper ends of the outer tubes 124. Such clamping bands are attached to flat annular walls 142 that are affixed to the top ends of the outer tubes. The clamping bands may be released by loosening the bolts 144 attached thereto, and the inner tubes may be freely moved downwardly or upwardly within the outer tubes to control the relative volumes of juice collected in the separate chambers 14 and 16.

In the operation of the juice extractor 12, after the beginning of the extraction cycle of an upper cup assembly 26 and an associated plunger tube 30 with a fruit F in the lower cup 22, the plug P is cut from the underside of the fruit to permit the juice-bearing internal portions of the fruit to be expressed from the interior of the fruit into the strainer tube 32. As the upper and lower cups continue to be pressed together, the plug is forced further into the strainer tube and the juice and internal material follows the plug into the strainer tube. Simultaneously therewith, the plunger tube is driven further upwardly within the strainer tube to exert pressure on the material within the strainer tube. Such pressure forces juice simultaneously through the perforations in the strainer tube into both the upper and lower chambers 14 and 16. Since the juice-bearing material within the strainer tube at the beginning of the cycle is under a lower pressure than it will be under later during the extraction cycle, there is little tendency for much minute material (such as broken membranes and embryonic seeds) to be forced through the perforations in the strainer tube.

As the upper cup assembly 26 is further lowered to further compress the citrus fruit F and the plunger tube 30 is driven further upwardly, the plunger will be elevated to the extent that its upper end is above with the dividing line L on the strainer tube that marks the division for entry into the upper and lower chambers 14 and 16 of the manifold. At this point, the juice and internal material will be under a considerably higher pressure than previously which will thereafter increase to a very high pressure. Such high pressure will tend to force a greater amount of minute citrus material with the juice into the upper chamber through the perforations in the upper portion of the strainer tube. However, since the upper chamber is sealed from the lower chamber, such juice component is collected only in the upper chamber. As previously described, such juice component having a higher minute solids content subsequently flows through the outlet conduit 96 and is processed separately from the juice component withdrawn through the outlet conduit 98 from the lower chamber.

It will be appreciated from the foregoing that the dual chamber manifold 10 enables juice types of differing minute solids content to be separated by an interdigitating cup type of citrus juice extractor without adversely affecting the basic operation of the extractor. One benefit of such capability is that the need for further finishing or processing equipment for the extracted juice collected in the lower chamber 16 will be minimized.

Although the best mode contemplated for carrying out the present invention has been herein shown and described, it will be apparent that modification and variation may be made without departing from what is regarded to be the subject matter of the invention.

What is claimed is:

1. Fruit processing apparatus for applying pressure to a fruit to extract the juice-bearing material therefrom, for separating juice from the juice-bearing material, and for collecting the juice, said apparatus comprising: opposed fruit-engaging cups arranged to move in interdigitating relationship to squeeze a fruit therebetween, means in one of the cups for cutting an opening in the peel of the fruit through which juice-bearing material within the fruit may be ejected during the squeezing of the fruit, a perforated strainer tube communicating with said opening, a plunger which is slidable in said tube toward said one cup to apply pressure to the juice-bearing material of the fruit that is ejected into the strainer tube for expressing juice within said juice-bearing material through the perforations in the strainer tube, and means for receiving the juice expressed through the strainer tube including one chamber that is arranged to receive juice expressed through one longitudinal portion of strainer tube and another separate chamber arranged to receive juice expressed through a different portion of the strainer tube, means for forming a fluid-tight seal with the strainer tube at the juncture between said chambers, and separate conduits respectively connected to the separate chambers for providing separate egress of the juices collected in said chambers.

2. The fruit processing aparatus according to claim 1 wherein one of said chambers of said juice receiving means includes an inner tubular wall mounted coaxially of the strainer tube, an outer tubular wall having an opening therein through which said inner wall extends, said means for forming a seal being mounted between said inner wall and said strainer tube, and means for adjustably mounting the inner wall to the outer wall to thereby control the portions of the strainer tube through which juice is respectively expressed into said separate chambers.

3. The fruit processing apparatus according to claim 2 wherein one of said chambers is disposed directly under said inner wall and the other chamber is disposed at the exterior of said outer wall.

4. An apparatus for applying pressure to a fruit to extract the juice therefrom, said apparatus including opposed fruit-receiving cups arranged to move in interdigitating relationship to squeeze a fruit therebetween, means in one of the cups defining an opening through which the juice-bearing material of the fruit may be ejected during the squeezing of the fruit, a perforated strainer tube projecting toward said cups and communicating with the opening in said one cup, a plunger slidable in said strainer tube toward said one cup to apply pressure to the juice-bearing material within the strainer tube, and means for receiving the juice extracted through the strainer tube including at least two separate chambers that are longitudinally arranged about the strainer tube for collecting juice expressed through longitudinally displaced portions of the strainer tube, and separate conduits respectively communicating with said separate chambers for providing separate egress of the juice collected in said chambers.

5. The apparatus according to claim 4 wherein said strainer tube is vertically mounted to extend downwardly of said one cup, one of said chambers of said juice receiving means including an inner tubular wall, an outer wall, means for forming a fluid-tight seal between the strainer tube and said inner tubular wall, and means for adjustably securing the inner tubular wall to the outer wall in a fluid-tight telescoping relationship therewith.

6. The fruit processing apparatus according to claim 5 wherein said chambers are formed in a housing including a bottom wall, upright side walls circumscribing the bottom wall, a partition wall between the side walls extending parallel to and above said bottom wall, said outer wall being tubular and extending perpendicularly from the partition wall concentrically about the strainer tube, and said separate conduits being connected to the side walls one above said partition wall and the other below said partition wall.

* * * * *